United States Patent [19]

Suzuki et al.

[11] Patent Number: 5,471,838
[45] Date of Patent: Dec. 5, 1995

[54] POWER STEERING APPARATUS FOR A VEHICLE

[75] Inventors: Mikio Suzuki, Hekinan; Kenichi Fukumura, Aichi; Hideya Kato, Okazaki, all of Japan

[73] Assignee: Toyoda Koki Kabushiki Kaisha, Kariya, Japan

[21] Appl. No.: 219,351

[22] Filed: Mar. 29, 1994

[30] Foreign Application Priority Data

Mar. 29, 1993 [JP] Japan ................................ 5-93743

[51] Int. Cl.⁶ ............................ F16D 31/02; F15B 9/10
[52] U.S. Cl. ........................ 60/468; 60/494; 91/375 R; 180/141
[58] Field of Search .......................... 91/375 R, 434; 60/384, 468, 494; 180/141

[56] References Cited

U.S. PATENT DOCUMENTS

| | | |
|---|---|---|
| 3,977,190 | 8/1976 | Kito et al. . |
| 3,994,361 | 11/1976 | Nishikawa et al. ............... 91/434 X |
| 4,442,857 | 4/1984 | Ohe et al. . |
| 4,609,331 | 9/1986 | Duffy . |
| 4,644,748 | 2/1987 | Goss et al. .................. 60/468 X |
| 4,676,334 | 6/1987 | Nakamura et al. ............. 91/434 X |
| 4,714,413 | 12/1987 | Duffy . |
| 4,805,714 | 2/1989 | Nakamura et al. ................ 180/141 |
| 5,111,660 | 5/1992 | Gettel ............................ 60/468 |
| 5,170,626 | 12/1992 | Ohtaki et al. . |

FOREIGN PATENT DOCUMENTS

| | | |
|---|---|---|
| 062360 | 10/1982 | European Pat. Off. . |
| 0159687 | 10/1985 | European Pat. Off. . |
| 1557350 | 12/1979 | United Kingdom . |
| 2176447 | 12/1986 | United Kingdom . |
| 2207896 | 2/1989 | United Kingdom . |
| WO83/03581 | 10/1983 | WIPO . |

*Primary Examiner*—Edward K. Look
*Assistant Examiner*—Hoang Nguyen
*Attorney, Agent, or Firm*—Oblon, Spivak, McClelland, Maier & Neustadt

[57] ABSTRACT

A power steering apparatus for a motor vehicle is provided with a metering orifice arranged on a supply passage and a flow control device in parallel relation with the metering orifice. The flow control valve includes a spool and a spring and moves the spool against the force of the spring in response to the pressure difference across the metering orifice for returning an excess part of operating fluid discharged from an engine-driven pump to an intake side of the pump so as to keep the flow rate towards a power assist gear unit almost constant regardless of changes in rotational speed of the pump. A drooping device cooperating with the flow control valve is provided comprising a control orifice at the upstream of the metering orifice and a bypass valve in communication with a spring chamber of the flow control valve retaining the spring. When the pressure difference across the control orifice exceeds a predetermined value with the increase in the pump rotational speed to a predetermined speed, the bypass valve operates to drain the pressure in the spring chamber. The load acting on the pump is thereby relieved. A bypass control valve is responsive to the pressure at the downstream of the metering orifice so as to restrict the draining of the pressure in the spring chamber when the power assist gear unit is brought into operation.

5 Claims, 4 Drawing Sheets

POWER STEERING APPARATUS FOR A VEHICLE

BACKGROUND OF THE INVENTION

1. Field of the Invention

The present invention relates to a power steering apparatus suitable for use in vehicles, and more particularly, to a power steering apparatus having a drooping mechanism capable of decreasing the flow rate of operating fluid supplied to a power assist gear unit thereof during high rotational speeds of an engine-driven pump.

2. Discussion of the Prior Art

For energy saving, a conventional hydraulic power steering apparatus is provided with a drooping mechanism, which operates to reduce the flow rate of operating fluid discharged from an engine-driven pump to a power-assist gear unit thereof when the rotational speed of the pump exceeds a predetermined value (i.e., in the high speed traveling of the vehicle). The provision of the drooping mechanism is because it is general that the power assist is hardly required during the high speed traveling and that the force to keep a steering wheel of the vehicle to its neutral position is rather required for the stability in handling, for which purpose the power assist force has to be reduced.

FIG. 1 shows the fluid circuit diagram of the aforementioned conventional power steering apparatus with such a drooping mechanism. The power steering apparatus comprises an engine-driven pump 50, a power assist gear unit 90 operated by means of operating fluid discharged from the pump 50, a supply passage 80 supplying the operating fluid from the pump 50 to the gear unit 90, and a flow control valve 70 for maintaining the flow rate of the fluid toward the gear unit 90 almost constant. The drooping mechanism comprises a control orifice 40 on the supply passage 80 and a variable throttle valve 30 arranged at the downstream of the control orifice 40 to operate in response to the pressure difference across the control orifice 40. The variable throttle valve 30 constitutes a flow control device together with the flow control valve 70.

FIG. 2 shows the concrete construction of the flow control device incorporating the drooping mechanism therein. The flow control valve 70 primarily comprises a spool 710 and a spring 720 and is formed with an oil inlet chamber 410 to which the operating fluid from the pump 50 is admitted. The control orifice 40 is provided at the downstream of the oil inlet chamber 410, and a sub-spool 310 is provided in turn at the downstream of the control orifice 40. A communication passage 420 is formed to lead the operating fluid from the oil inlet chamber 410 to the shoulder portion of the sub-spool 310. A metering orifice 330 is further provided at the downstream of the sub-spool 310. When moved against the force of a spring 320 in response to the pressure difference across the control orifice 40, the sub-spool 310 reduces the opening area of the metering orifice 330.

In the flow control device of the construction above, the operating fluid discharged from the pump 50 is supplied to the oil inlet chamber 410. The operating fluid, after being controlled by the control orifice 40, passes through a spool head chamber 430 and a through hole 340 of the sub-spool 310 and then, is controlled by the metering orifice 330 to a predetermined flow rate so as to be delivered from a delivery port 810 to the power assist gear unit 90. When the rotational speed of the pump 50 rises thereby to increase the discharge volume from the pump 50, the difference between the pressures at the upstream and downstream of the control orifice 40 increases. This causes the sub-spool 310 to move against the force of the spring 320, and the opening area of the metering orifice 330 is reduced, whereby the flow rate of the operating fluid which supplied to the power assist gear unit 90 through the metering orifice 330 is decreased: namely, a so-called drooping operation is carried out. This drooping operation works for the stability of the vehicle in a high-speed traveling.

However, the pressure within the flow control device including the flow control valve 70 is raised during the drooping operation being carried out. More specifically, although increases in the rotational speed and hence, the discharge volume of the pump 50 causes the pressure difference across the metering orifice 330 to increase, changes in the pressure difference act on the sub-spool 310 to reduce the opening area of the metering orifice 330. As a consequence, the flow resistance of the metering orifice 330 is increased, whereby the pressure in the oil inlet chamber 410 when the opening area of the metering orifice is not reduced becomes higher than when the opening area is reduced. The pressure increase in the oil inlet chamber 410 disadvantageously results in imposing a larger load on the pump 50, so that during the drooping operation, more engine power is consumed at the sacrifice of the stability of the vehicle in the high-speed traveling.

Another power steering apparatus has been known which, as described in Japanese examined, published patent application No. 54-5571, is provided with a flow control device capable of relieving the load imposed on an engine-driven pump during high speed traveling of the vehicle. In this known apparatus, the pressure of the operating fluid is lowered by draining the fluid within a spring chamber of a flow control valve during high speed traveling of the vehicle. However, this known apparatus requires a vehicle-speed sensing means, an electric control device, a solenoid-operated valve and the like and therefore, results in high cost. Power steering apparatus of the similar type have also been known by U.S. Pat. Nos. 4,609,331 and 4,714,413 to James J. Duffy.

SUMMARY OF THE INVENTION

Accordingly, it is a primary object of the present invention to provide an improved power steering apparatus capable of sufficiently saving the engine power of a vehicle by the use of a flow control device of a low manufacturing cost.

Another object of the present invention is to provide an improved power steering apparatus which is not only of energy saving and low cost, but also reliable in operation is terms of no electronic control means being employed.

A further object of the present invention is to provide an improved power steering apparatus which is capable of supplying a power assist gear unit with pressurized fluid of a required flow rate immediately when a steering wheel is turned during a high speed traveling.

Briefly, according to the present invention, there is provided a hydraulic power steering apparatus for a motor vehicle comprising a power assist gear unit, a pump for supplying the gear unit with operating fluid through a supply passage and a metering orifice thereon, a flow control valve responsive to the pressure difference across the metering orifice for returning an excess part of the pump-discharged operating fluid to an intake side of the pump when the pump-discharged operating fluid exceeds a predetermined flow rate, and a drooping mechanism cooperating with the fluid control valve during a high speed rotation of the pump for decreasing the flow rate of the operating fluid towards the power assist gear unit. Preferably, the drooping mechanism includes a control orifice arranged at the upstream of the metering orifice and the flow control valve and a bypass valve communicating with a spring chamber of the flow control valve. The bypass valve operates in response to the pressure difference across the control orifice for draining the pressure in the spring chamber of the flow control valve when the rotational speed of the pump exceeds a predetermined speed.

With this configuration, the operating fluid discharged from the pump is delivered to the power assist gear unit through the control and metering orifices. The flow control valve returns an excess part of the operating fluid to the pump inlet side thereby to keep the operating fluid towards the power assist gear unit almost constant regardless of increases in the pump rotational speed. When the pressure difference across the control orifice exceeds a predetermined value, in other words, when the pump rotates at a predetermined high speed, the bypass valve drains the pressure in the spring chamber of the flow control valve. Because the flow control valve operates to keep almost constant the pressure difference between the upstream and downstream of the metering orifice, the pressure at the upstream of the metering orifice, that is to say, the pressure of the pump-discharged fluid is lowered in connection with the draining of the pressure in the spring chamber. This advantageously results in relieving the load imposed on the pump, whereby the engine power of the vehicle can be saved.

In another aspect of the present invention, there is further provided a bypass control means for recovering the flow rate of the operating fluid towards the power assist gear unit when handling a steering wheel of the vehicle causes the load pressure acting on the power assist gear unit to increase. The bypass control valves restricts the draining of the pressure in the spring chamber when the load pressure acting on the power assist gear unit is increased.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF THE PREFERRED EMBODIMENT

Figure 3:
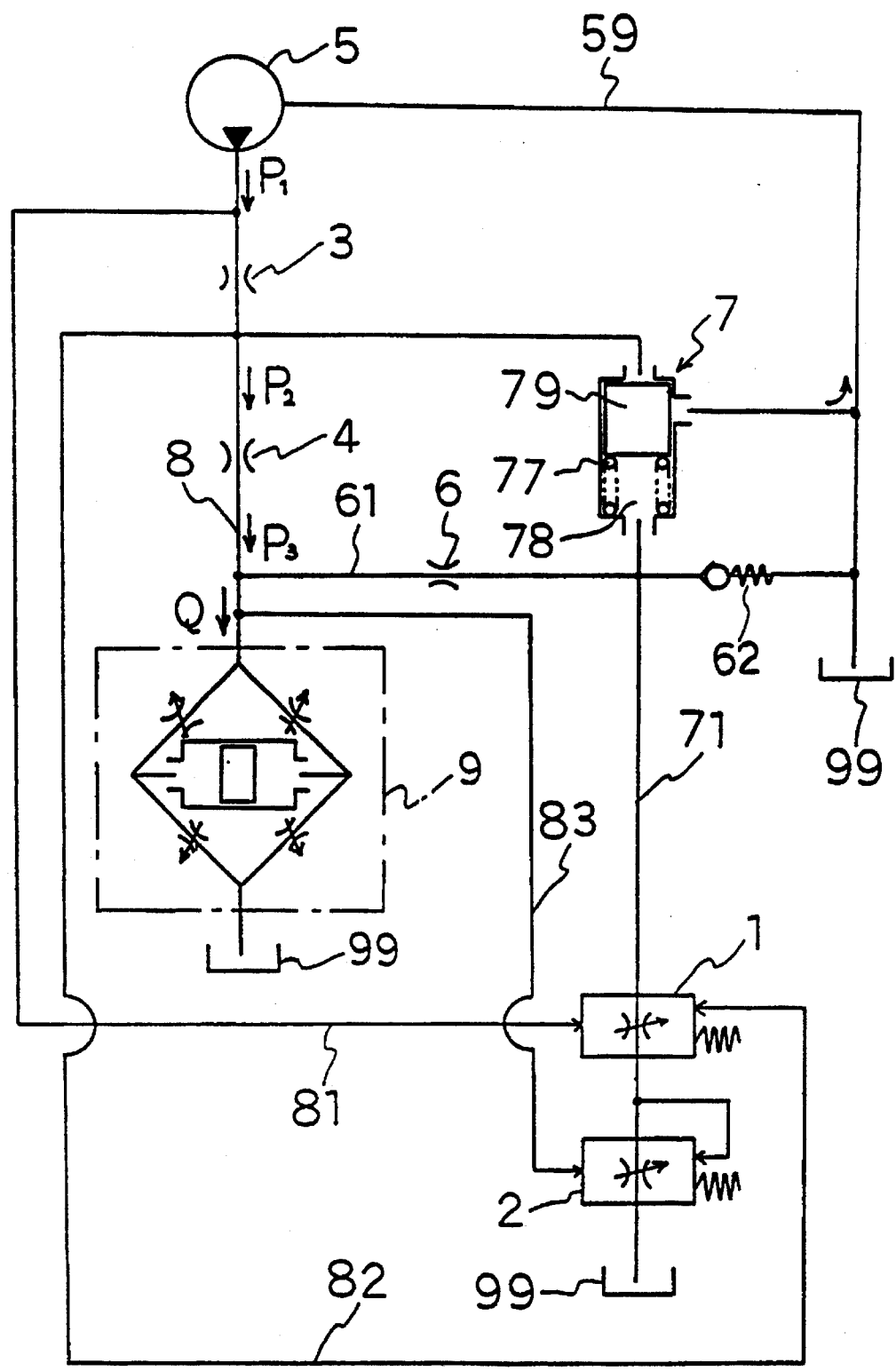
FIG. 3 shows a fluid circuit diagram of a power steering apparatus with a flow control device according to the present invention.
Figure 4:
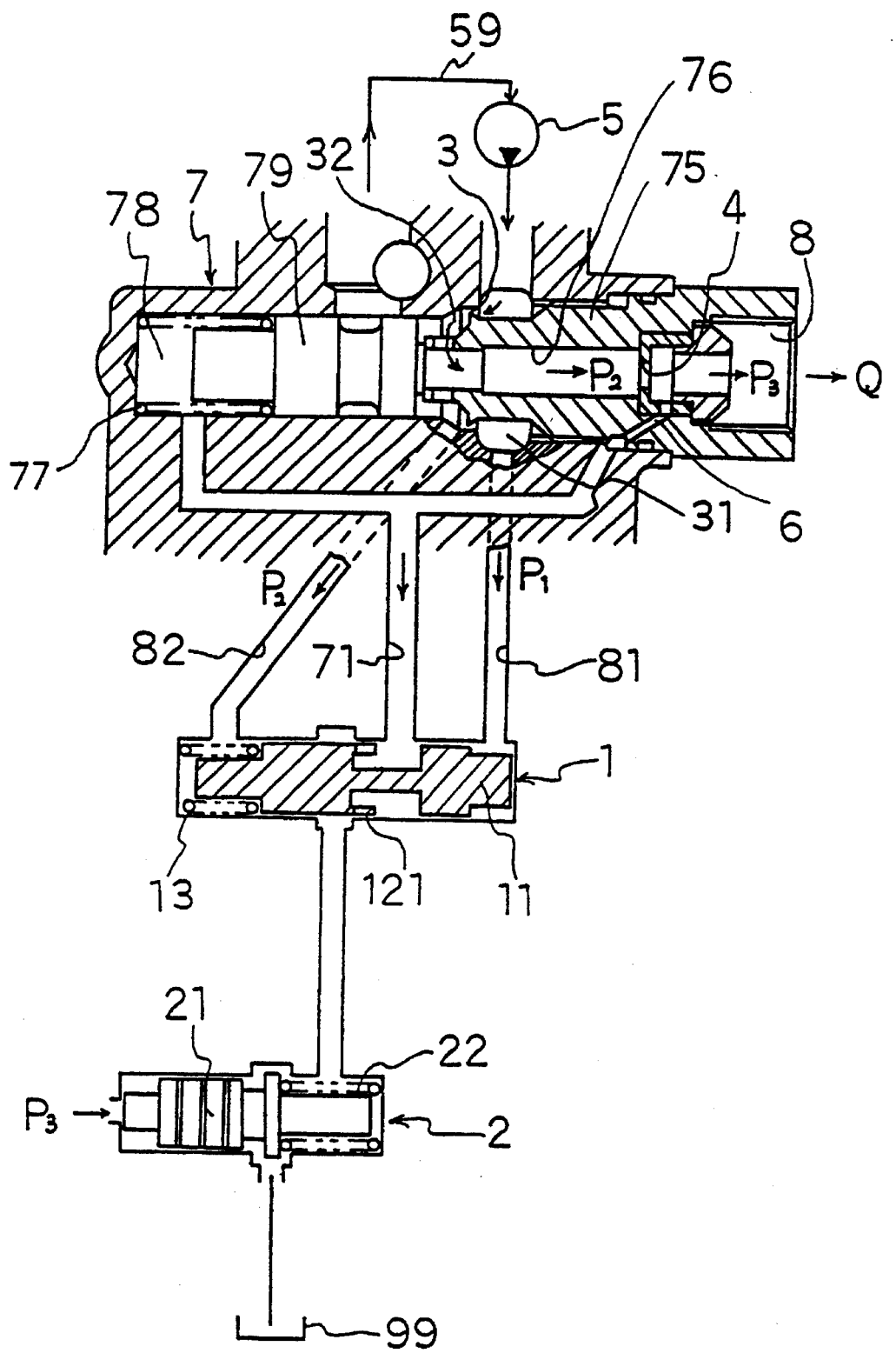
FIG. 4 shows the details of the flow control device shown in FIG. 3.

Referring now to the drawings and particularly to FIGS. 3 and 4, a power steering apparatus according to the present invention comprises a pump 5 of the type whose rotational speed changes as the traveling speed of a vehicle increases as, typically, being driven by an engine of the vehicle (both not shown), a power assist gear unit 9 which receives operating fluid supplied from the pump 5 for power assist operation, and a flow control device. The power assist gear unit 9 is of a so-called "center-open" type well known in the art. The flow control device is composed of fixed control and metering orifices 3 and 4 which are in turn arranged on a supply passage 8 leading from the pump 5 to the power assist gear unit 9, and a flow control valve 7 for controlling the pressure difference across the metering orifice 4 to a predetermined value so as to keep the flow rate towards the gear unit 9 almost constant regardless of changes in the rotational speed of the pump 5.

A bypass passage 61 is connected to the downstream of the metering orifice 4 and through another fixed orifice 6, communicates to a spring chamber 78 of the flow control valve 7 and further through a relief valve 62, to an inlet side or port of the pump 5 and a reservoir 99. Although not shown in FIG. 4, the relief valve 62 is incorporated in a spool 79 of the flow control valve 7, as is well known in the art. Between the spring chamber 78 of the flow control valve 7 and the reservoir 99, there is connected a drain passage 71, on which is arranged a bypass valve 1 operable in response to the pressure difference between the upstream and downstream of the control orifice 3. At the downstream of the bypass valve 1, there is further arranged a bypass control valve 2, which is operable in response to change in the load pressure acting on the power assist gear unit 9.

First and second branch passages 81, 82 respectively extend from the upstream and downstream of the control orifice 3, and a third branch passage 83 extends from inbetween the downstream of the metering orifice 4 and the upstream of the power assist gear unit 9. The first and second branch passages 81, 82 are connected to the bypass valve 1 to lead thereto the pressure difference (P1-P2) between the upstream and downstream of the control orifice 3, while the third branch passage 83 is connected to the bypass control valve 2 to lead thereto the load pressure P3 acting on the power assist gear unit 9.

FIG. 4 shows the concrete construction of the aforementioned flow control device. A housing of the flow control valve 7 receives the spool 79 and a spring 77 therein and is formed with an oil inlet chamber 31 and a spring chamber 78 at opposite ends of the spool 79. A union 75 in axial alignment with the spool 79 is inserted into, and fixed to, the housing of the flow control valve 7 and is formed at its front end portion with a circular flange which together with the housing, defines the control orifice 3. The circular flange separates the oil inlet chamber 31 at its upstream from a spool-head chamber 32 at its downstream. The union 75 is formed with a through hole 76, which is provided therein with a throttle element defining the metering orifice 4. Thus, the fluid admitted in the spool head chamber 32 is divided into two streams, one flowing towards the gear unit 9 through the through hole 76 of the union 75 and the metering orifice 4 and the other returning to the intake side of the pump 5 through a return passage 59 which opens when the spool 79 is moved against the force of the spring 77. The downstream of the metering orifice 4 is also in fluid communication with the spring chamber 78 through the aforementioned fixed orifice 6.

The bypass valve 1 comprises a spool 11 and a spring 13. The spool 11 is formed at its middle portion with a throttle 121 which takes the form of slit grooves or the like. One end and the other spring-biased end of the spool 11 are respectively in fluid communication with the oil inlet chamber 31 and the spool-head chamber 32 through the aforementioned first and second branch passages 81, 82. When the pressure in the oil inlet chamber 31 increases to a predetermined value dependent on the spring 13 than that in the spool-head chamber 32, the spool 11 begins to move and the throttle 121 begins to open thereby to lower the pressure in the spring chamber 78. The bypass control valve 2 comprises a spool 21 and spring 22. When the load pressure P3 is increased upon the operation of the power assist gear unit 9, the spool 21 is moved against the force of the spring 22 and restricts the fluid which is drained from the bypass valve 1 to the reservoir 99. Thus, this bypass control valve 2 works to recover the pressure in the spring chamber 78 to such a value that the flow rate towards the power assist gear unit 9 is increased from Qmin to Qmax indicated in FIG. 5.

The operation of the apparatus as constructed above will be described hereinafter.

Figure 1:
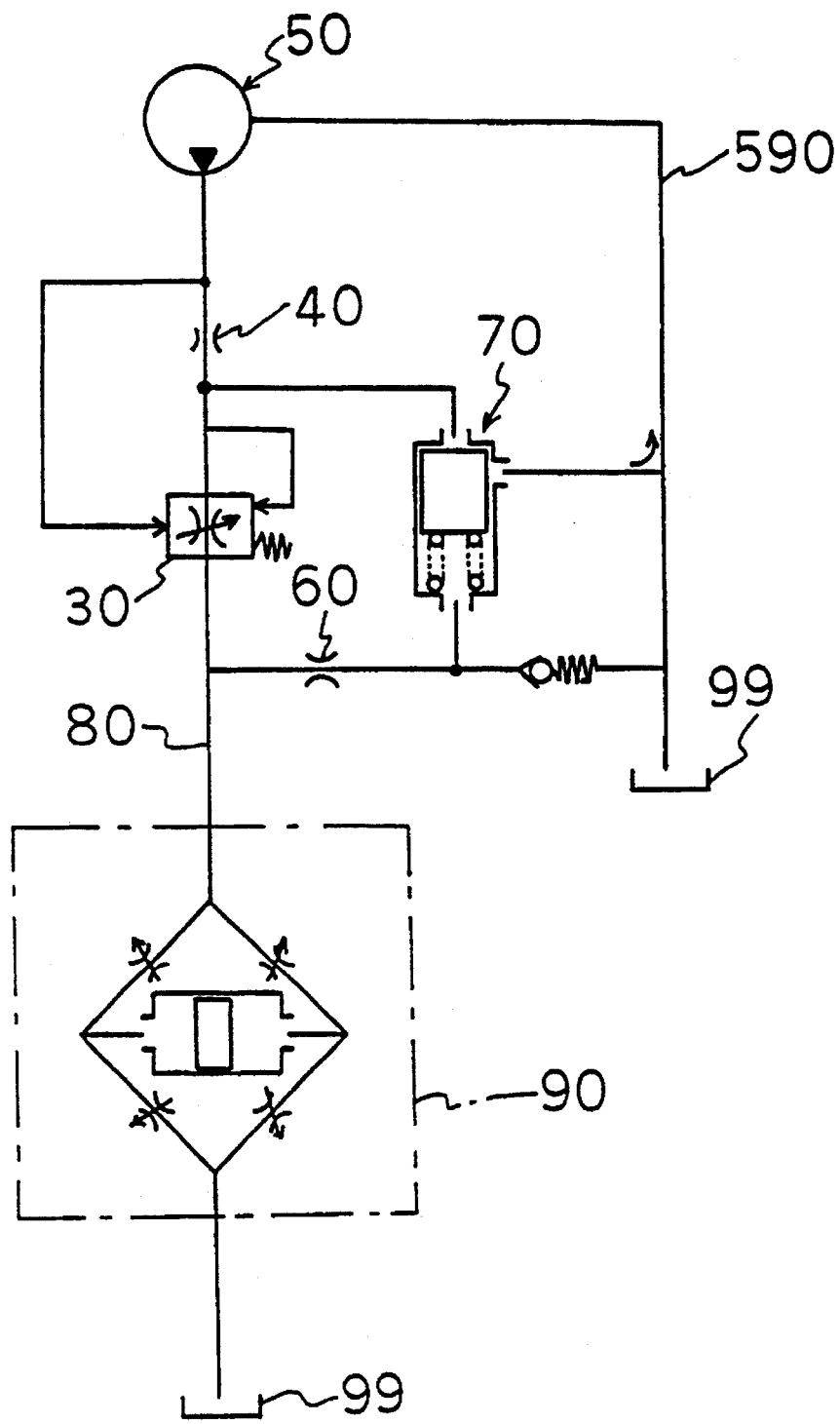
FIG. 1 shows a fluid circuit diagram of a conventional power steering apparatus with a drooping mechanism.
Figure 2:
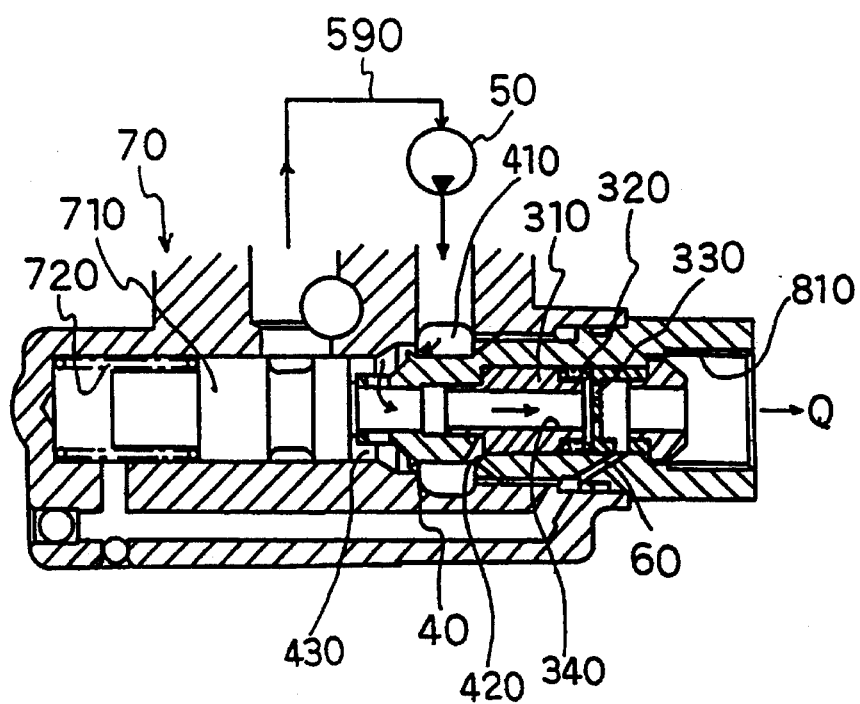
FIG. 2 shows the details of a flow control device used in the apparatus shown in FIG. 1.
Figure 5:
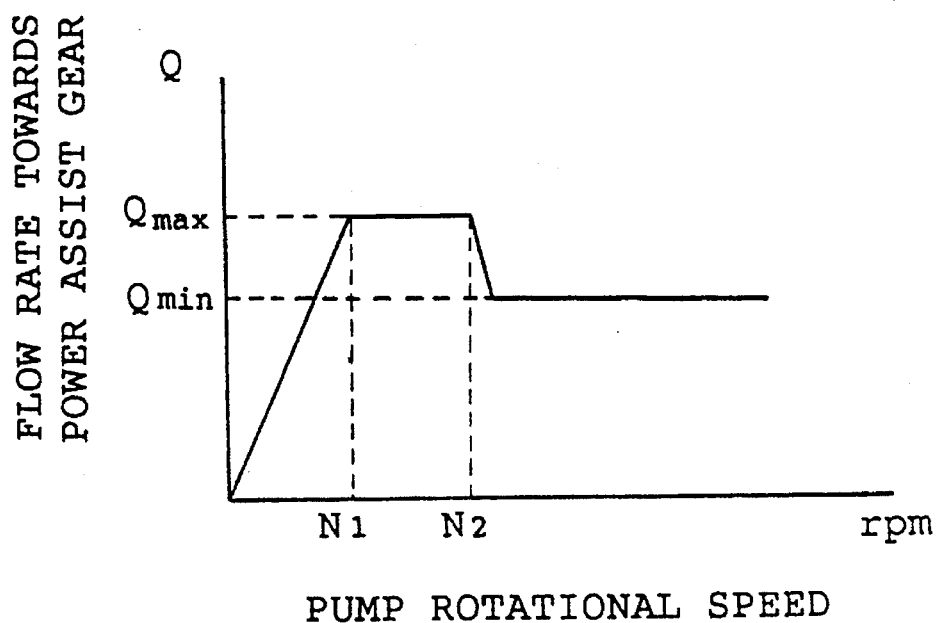
FIG. 5 shows a graph representing the relationship between the flow rate of a fluid supplied to a power assist gear unit of the apparatus and the rotational speed of a pump.

When the engine-driven pump 5 is rotated, the operating fluid discharged therefrom is controlled by the flow control device comprising the control and metering orifices 3, 4 and the flow control valve 7. As the rotational speed of the pump 5 is heightened to increase the flow rate of the operating fluid discharged therefrom, the pressure P2 at the downstream of the control orifice 3 is raised. This causes the pressure difference (P2-P3) across the metering orifice 4 to increase, so that the spool 79 of the flow control valve 7 is moved to open the return passage 59 and returns the excess part of the operating fluid to the intake side of the pump 5. This occurs when the rotational speed of the pump 5 reaches N1 indicated in FIG. 5. Thus, after the rotational speed exceeds N1, the operating fluid of an almost constant flow rate indicated as Qmax in FIG. 5 is supplied to the power assist gear unit 9. In other words, the flow control valve 7 works to keep the flow rate towards the gear unit 9 almost constant regardless of changes in the rotational speed of the pump 5. In this situation, since the pressure difference (P1-P2) across the metering orifice 3 is not so large, the spool 11 of the bypass valve 1 is kept in position to close the throttle 121.

As the rotational speed of the pump 5 is further heightened to more than N2 indicated in FIG. 5 which occurs in the high-speed traveling of the vehicle, the pressure difference (P1-P2) across the control orifice 3 increases and exceeds a predetermined value depending on the spring 13. At this time, the spool 11 of the bypass valve 1 begins to move against the force of the spring 13 and thereby to open the throttle 121. As a result, the spring chamber 78 of the flow control valve 7 is brought into fluid communication with the reservoir 99 through the bypass control valve 2 so as to lower the pressure in the spring chamber 78. This permits the spool 79 of the flow control valve 7 to further move against the spring 77, and the return flow rate to the return passage 59 is increased. Consequently, the pressure P2 at the upstream of the metering orifice 4 is lowered to diminish the pressure difference (P2-P3), whereby the flow rate towards the power assist gear unit 9 is reduced to Qmin indicated in FIG. 5. In this manner, the drooping operation is performed. According to the present invention, the drooping operation is performed by lowering the pressure in the spring chamber 78. Because lowering the pressure in the spring chamber 78 results in lowering the pressure in the oil inlet chamber 31 at the upstream of the control orifice 3, the load imposed on the pump 5 is relieved, and hence, the consumption of the engine power is reduced.

It is often the case that the power assist gear unit 9 is brought into operation even when the drooping operation is being performed in the high-speed traveling of the vehicle. In this event, the pressure P3 at the down stream of the metering orifice 4 is raised by the operation of the power assist gear unit 9 which is effected by turning the steering wheel of the vehicle. The increase in the pressure P3 causes the spool 21 of the bypass control valve 2 to move against the force of the spring 22 so as to reduce the flow rate drained to the reservoir 99. Therefore, the pressure in the spring chamber 78 of the flow control valve 7 is heightened to reduce the return flow towards the return passage 59. As a result, the flow rate of the operating fluid supplied to the power assist gear unit 9 is increased from Qmin indicated in FIG. 5 towards Qmax even when the pump is rotated at a higher speed than N2, whereby the gear unit 9 is supplied with the operating fluid of a flow rate sufficient to generate a required pressure or power assist.

Obviously, numerous modifications and variations of the present invention are possible in light of the above teachings. It is therefore to be understood that within the scope of the appended claims, the present invention may be practiced otherwise than as specifically described herein.

What is claimed is:

1. A power steering apparatus for a vehicle comprising:

a pump of the type the rotational speed of which is changed depending on the traveling speed of said vehicle;

a power assist unit for generating an assist force upon receipt of operating fluid discharged from said pump;

a metering orifice arranged on a supply passage leading the operating fluid discharged from said pump to said power assist unit;

a flow control valve having a chamber which receives a pressure dependent upon a pressure downstream of the metering orifice and responsive to the pressure difference across said metering orifice for returning a part of the operating fluid discharged from said pump to an intake side of said pump so as to regulate the flow rate of said operating fluid towards said power assist unit to an almost constant flow rate regardless of changes in the rotational speed of said pump; and drooping means responsive to a high-rotational speed of said pump for cooperating with said flow control valve so as to decrease the flow rate of the operating fluid towards said power assist unit to a lower flow rate than said almost constant flow rate regulated by said flow control valve and being responsive to the pressure in said chamber so as to reduce the pressure at the upstream of said metering orifice.

2. A power steering apparatus as set forth in claim 1, wherein said drooping means includes means responsive to the pressure at the downstream of said metering orifice for increasing the flow rate of the operating fluid towards said power assist unit from said lower flow rate towards said almost constant flow rate as the pressure at the downstream of said metering orifice is raised by the operation of the power assist unit.

3. A power steering apparatus for a vehicle comprising:

an engine-driven pump;

a power assist unit for generating an assist force upon receipt of operating fluid discharged from said pump;

a first orifice arranged on a supply passage leading the operating fluid discharged from said pump to said power assist unit;

a flow control valve including a spool, a spring and a second orifice leading the down stream of said first orifice to a spring chamber retaining said spring, said spool being movable against the force of said spring in response to the pressure difference across said first orifice for returning a part of the operating fluid discharged from said pump to an intake side of said pump so as to regulate the flow rate of said operating fluid towards said power assist unit to an almost constant flow rate regardless of changes in the rotational speed of said pump;

a third orifice arranged at the upstream of said first orifice and said flow control valve; and a bypass valve in fluid communication with said spring chamber of said flow control valve and responsive to the pressure difference across said third orifice for draining and lowering the pressure in said spring chamber of said flow control valve when the pressure difference across said third orifice exceeds a predetermined value with increases in the rotational speed of said pump.

4. A power steering apparatus as set forth in claim 3, further comprising:

a bypass control valve arranged at the downstream of said bypass valve and responsive to the pressure at the downstream of said first orifice for restricting the draining of the pressure in said spring chamber of said flow control valve as the pressure at the downstream of said first orifice increases upon the operation of said power assist gear unit.

5. A power steering apparatus as set forth in claim 1, wherein said drooping means is in fluid communication with said chamber of said flow control valve and drains the pressure in said chamber to increase the operating fluid returned to the intake side of said pump, during the high rotational speed of said pump.

* * * * *